Jan. 12, 1971 W. B. NOLAND 3,553,757
AUTOMATIC LOCKING DOCK PLATE
Filed June 12, 1969 2 Sheets-Sheet 1

INVENTOR
WAYNE B. NOLAND
BY
Zarley, McKee & Thomte
ATTORNEYS

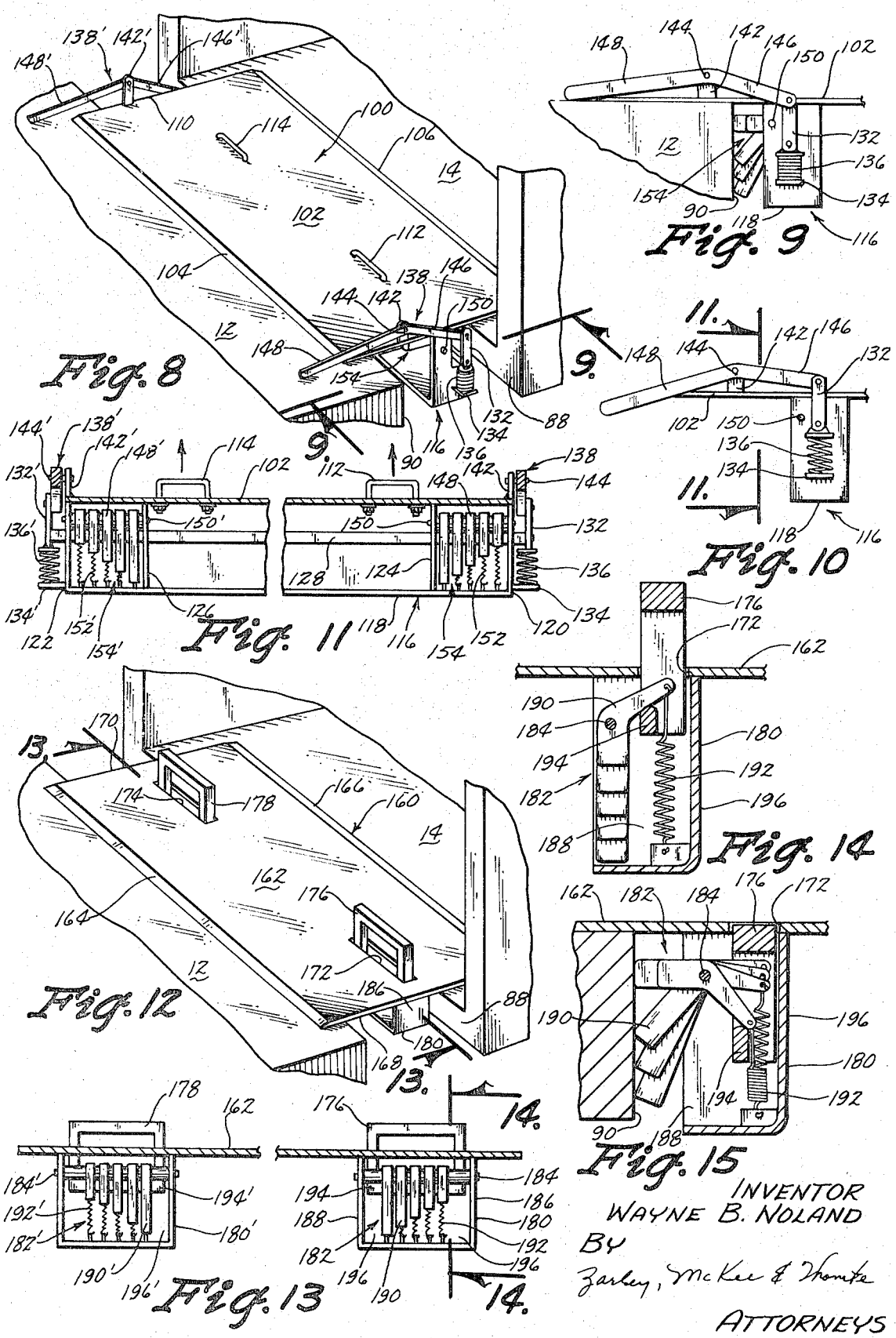

United States Patent Office 3,553,757
Patented Jan. 12, 1971

3,553,757
AUTOMATIC LOCKING DOCK PLATE
Wayne B. Noland, Carlisle, Iowa, assignor to Woodford
 Manufacturing Company, Des Moines, Iowa, a corporation of Iowa
Filed June 12, 1969, Ser. No. 832,714
Int. Cl. E01d *15/12*
U.S. Cl. 14—72
7 Claims

ABSTRACT OF THE DISCLOSURE

An automatic locking dock plate adapted to bridge supporting structures, and having means thereon to lock the dock plate in position although the distance between the structures may vary. Three embodiments are disclosed and all employ one or more spring loaded locking fingers which pivot into locking position when the dock plate has been positioned between the supporting structures so that a locking finger abuts against one of the supporting structures if the distance between supporting structures is greater than the width of the fixed stop formed by the edges of the dock plate. The three embodiments each employ an override means which overrides the springs connected to the fingers so that the fingers will be pivoted to an unlocked position when the dock plate has been raised by a fork lift truck or the like. The fingers are provided with varying lengths to compensate for various distances between the supporting structures.

---

Dock plates are commonly used to bridge the span between supporting structures such as a loading dock and truck. Fork lift trucks or the like are frequently driven over these dock plates so it is imperative that the dock plates be prevented from moving out of position. Self locking dock plates have heretofore been devised and applicant has previously been granted U.S. Letters Patent No. 3,192,546 which issued on July 6, 1965. The invention disclosed herein is a distinct improvement in the art as well as being an improvement over applicant's previous patent.

Therefore, it is a principal object of this invention to provide an automatic locking dock plate.

A further object of this invention is to provide an automatic dock plate which compensates for various distances between the supporting structures.

A further object of this invention is to provide an automatic dock plate which positively prevents movement of the dock plate during use.

A further object of this invention is to provide an automatic dock plate which includes at least a spring loaded locking finger adapted to engage the loading dock.

A further object of this invention is to provide an automatic dock plate which includes means to override the spring loaded locking finger.

A further object of this invention is to provide an automatic dock plate which provides a convenient means for transporting the dock plate.

A further object of this invention is to provide an automatic dock plate which coordinates the fork lift handle means and the locking means.

A further object of this invention is to provide an automatic dock plate which is economical of manufacture, durable in use and refined in appearance.

These and other objects will be apparent to those skilled in the art.

This invention consists in the construction, arrangements, and combination of the various parts of the device, whereby the objects contemplates are attained as hereinafter more fully set forth, specifically pointed out in the claims, and illustrated in the accompanying drawings in which:

FIG. 8 is a view similar to FIG. 1 except that a modified form of the dock plate is illustrated;

FIG. 9 is an end view of the dock plate of FIG. 8 as seen along lines 9—9 of FIG. 8;

FIG. 10 is a view similar to FIG. 9 except that the locking mechanism is illustrated in an inoperative position;

FIG. 11 is a fragmentary sectional view as seen along lines 11—11 of FIG. 10;

FIG. 12 is a view similar to FIGS. 1 and 8 except that a further modified form of the dock plate is illustrated;

FIG. 13 is a fragmentary sectional view as seen along lines 13—13 of FIG. 12;

FIG. 14 is an enlarged sectional view as seen along lines 14—14 of FIG. 13; and

FIG. 15 is a view similar to FIG. 14 except that the locking mechanism has pivoted to a locking position.

Figure 1:
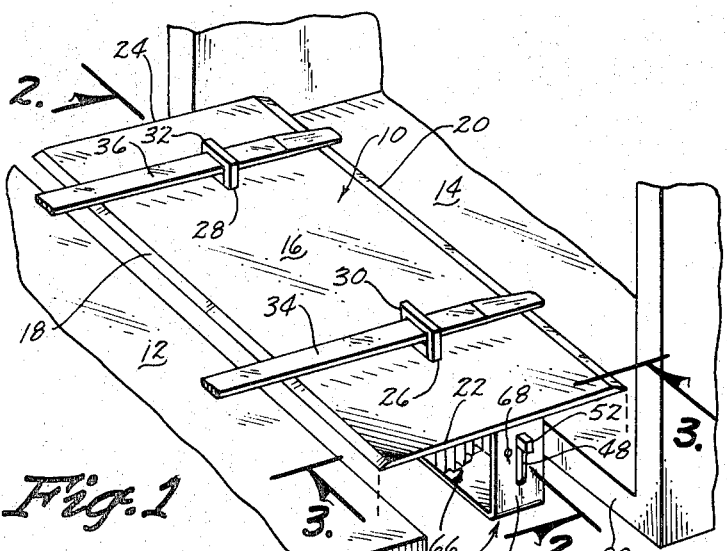
FIG. 1 is a perspective view illustrating one form of the dock plate being positioned between a dock and a carrier.
Figure 3:
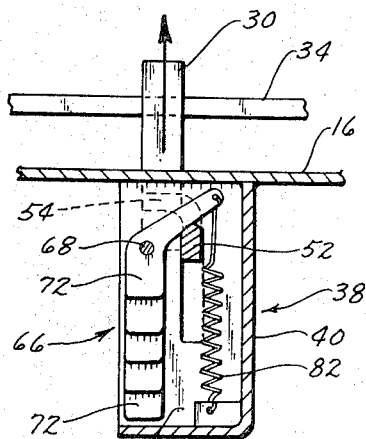
FIG. 3 is an enlarged sectional view as seen along lines 3—3 of FIG. 1.
Figure 2:
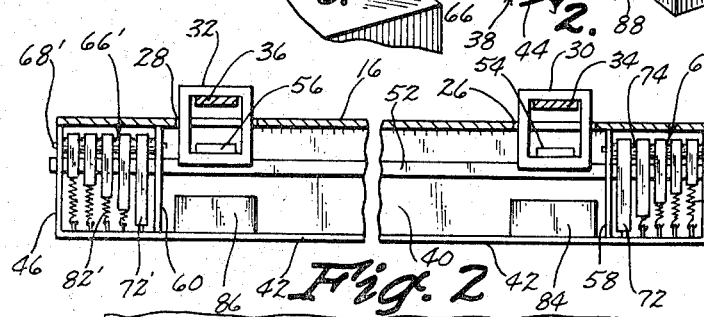
FIG. 2 is a fragmentary sectional view as seen along lines 2—2 of FIG. 1.

The dock plate of FIGS. 1–7 is referred to generally by the reference number 10 and is adapted to span the space between a loading dock 12 and the bed of the carrier 14. Dock plate 10 includes a platform 16 having tapered ends 18 and 20 and sides 22 and 24. Platform 16 is provided with a pair of rectangular openings 26 and 28 formed therein having handles 30 and 32 vertically movably received thereby respectively. As seen in FIGS. 1 and 2, handles 30 and 32 are adapted to receive the forks 34 and 36 of a fork lift truck or the like extending therethrough. A hollow housing 38 is provided on the underside of platform 16 (FIG. 1) and includes a downwardly extending wall portion 40 having a bottom portion 42 extending horizontally from the lower end thereof toward end 18. Housing 38 also includes end portions 44 and 46 which are provided with vertically disposed slots 48 and 60 formed therein respectively.

Bar 52 extends through housing 38 and has its opposite ends extending outwardly through slots 48 and 50. Bar 52 has a pair of arms 54 and 56 extending outwardly therefrom which extend through the handles 30 and 32 respectively so that the upward movement of the handles 30 and 32 by the forks 34 and 36 will cause bar 52 to be raised until the ends thereof engage the upper ends of the slots 48 and 50. As seen in FIG. 2, housing 38 is provided with vertical wall members 58 and 60 which are positioned inwardly of ends 46 and 48 respectively. Wall members 58 and 60 are also provided with vertical slots 62 and 64 formed therein which are aligned with slots 48 and 50 and which also have the bar 52 extending therethrough.

Figure 5:
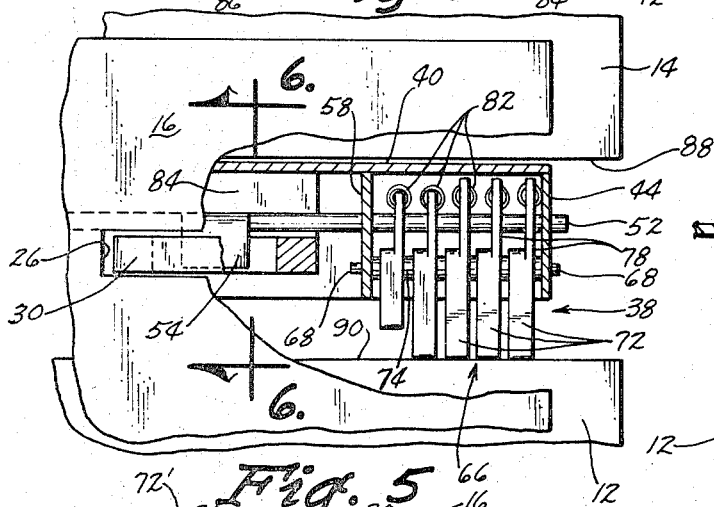
FIG. 5 is an enlarged top view as seen along lines 5—5 of FIG. 4 with portions thereof cut away to more fully illustrate the invention.
Figure 7:
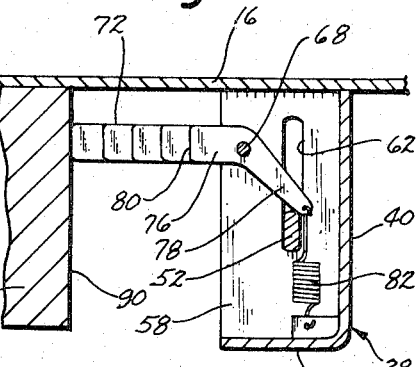
FIG. 7 is a view similar to FIG. 4 except that all of the finger members have been pivoted to a locking position.
Figure 6:
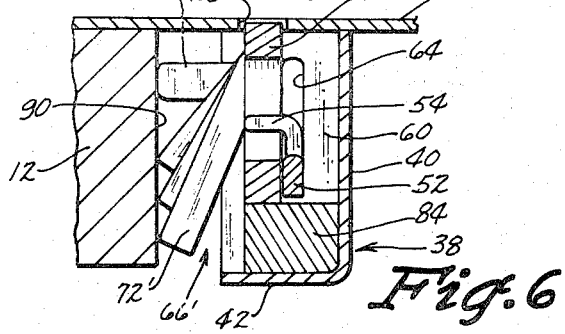
FIG. 6 is an enlarged sectional view as seen along lines 6—6 of FIG. 5.

The numerals 66 and 66' generally refer to the locking mechanisms positioned at opposite sides of the dock plate. Inasmuch as locking mechanisms 66 and 66' are identical, only locking mechanism 66 will be described in detail with identical structure on locking mechanism 66' being indicated by '. Shaft 68 is mounted in and extends between end 44 and wall member 58 as best illustrated in FIG. 5. A plurality of locking fingers 72 are pivotally mounted on shaft 68 and have spacers 74 positioned therebetween. Each of the fingers includes angularly disposed portions 76 and 78. As seen in FIG. 7, the fingers each have end portions 80 which are vertically disposed when the fingers are pivoted as indicated therein. Each of the fingers 72 have a spring means 82 connected to portion 78 and to bottom portion 42 to normally pivotally urge the fingers to the position seen in FIG. 7. As seen in FIGS. 5, 6 and 7, bar 52 extends beneath the portions 78 and is adapted to raise the same when it is raised so that the fingers will pivot to the position of FIG. 3.

In operation, the handles 26 and 28 are normally positioned in housing 38 with only the upper ends thereof being exposed on platform 16. Handles 26 and 28 are limited in their downward movement by stops 84 and 86 on bottom portion 42 respectively. When handles 26 and 28 are in their lowered position, bar 52 will also be in the lower ends of slots 48, 50, 62 and 64. The fingers 72 and 72' will be in a position such as illustrated in FIG. 7 due to the springs 82 and 82' pivoting the same on shafts 68 and 68' respectively.

Figure 4:
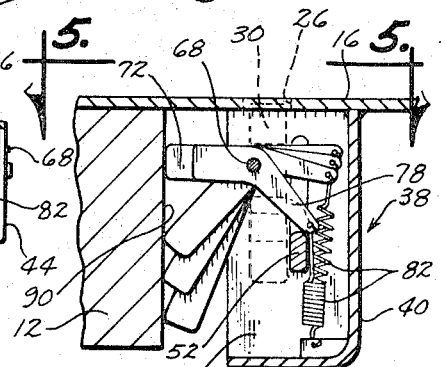
FIG. 4 is a view similar to FIG. 3 except that certain of the fingers of the locking mechanism have been pivoted.

When it is desired to use the dock plate 10 to span the area between the dock 12 and the carrier 14, the forks 34 and 36 of the fork lift truck are extended through the handles 30 and 32 respectively. The fork lift truck may then transport the dock plate 10 to the desired location and position the same between the dock 12 and carrier 14. The upward movement of handles 30 and 32 by the forks 34 and 36 causes handles 30 and 32 to raise arms 54 and 56 which cause bar 52 to be raised to the position of FIG. 3. The movement of bar 52 to the position of FIG. 3 causes the fingers 72 and 72' to be pivoted so that the portions 76 and 76' extend downwardly within housing 38. The fork lift truck positions the dock plate 10 so that the wall 40 abuts against the surface 88 of carrier 14 and the undersides of ends 18 and 20 rest upon the upper surfaces of dock 12 and the bed of the carrier 14. The forks 34 and 36 are then removed from the handles 30 and 32 which permits the fingers 72 and 72' to pivot on shafts 68 and 68'. The portions 76 and 76' of fingers 72 and 72' pivot upwardly until they engage the surface 90 of dock 12 as illustrated in FIG. 4. Inasmuch as the lengths of the various portions 78 and 78' vary, it may be that only a few of the fingers 72 and 72' will return completely to their original position as illustrated in FIG. 4. The progressive varying lengths of the fingers 72 and 72' insures that one finger 72 and 72' will be pivoted so that the end portion 80 will abut against the surface 90. Thus, the fingers 72 and 72' automatically lock the dock plate 10 in place between the dock 12 and the carrier 14 although the distance therebetween may vary somewhat. The automatic locking of the fingers 72 and 72' against the surface 90 compensates for variances in the distance between the carrier and the dock and positively prevents the dock plate 10 from moving towards the dock or carrier when equipment is passed thereover. The dock plate 10 is easily moved from between the dock and carrier by inserting the forks 34 and 36 into the handles 30 and 32 and lifting the same from therebetween.

The dock plate of FIGS. 8–11 is referred to generally by the reference numeral 100 and is adapted to span the space between a loading dock 12 and the bed of the carrier 14. Dock plate 100 includes a platform 102 having tapered ends 104 and 106 and sides 108 and 110. Platform 102 is provided with a pair of handles 112 and 114 which are vertically movably mounted thereon so as to be able to be raised from the position of FIG. 8 to the position of FIG. 11 to facilitate the insertion of the fork of a fork lift truck therebetween. As seen in FIG. 7, handles 112 and 114 are limited in their upward movement by bolt means or the like mounted on the lower ends thereof beneath the platform 102.

A hollow housing 116 is provided on the underside of platform 102 and includes a bottom 118, ends 120 and 122, and interior wall members 124 and 126. Bar 128 extends through housing 116 and extends through suitable slots formed in ends 120 and 122 and interior wall members 124 and 126 so as to be vertically movable with respect thereto. End 130 of bar 128 is secured to a link 132 by any convenient means. A bracket 134 is secured to end 120 below link 132 and extends outwardly therefrom as illustrated in FIGS. 8 and 11. Spring 136 is secured to the lower end of link 132 and to the upper end of bracket 134 and normally urges link 132 upwardly from bracket 134. The numeral 138 generally designates a pivot arm which is pivotally connected at one end to the upper end of link 132 by a pin 140. Ear 142 is secured to platform 102 adjacent side 108 and has the pivot arm 138 pivotally secured thereto by a pin 144. As seen in FIG. 8, pivot arm 138 extends towards the dock 12 and is comprised generally of angularly disposed arm portions 146 and 148.

The numeral 148 refers generally to a plurality of locking fingers which are pivotally mounted on a shaft 150 extending between end 120 and wall member 124. As seen in FIG. 11, each of the locking fingers 148 has a spring 152 associated therewith. The locking fingers 148 and springs 152 function in an identical manner to the fingers 72 and springs 82 in the dock plate of FIGS. 1–7. The bar 128 passes beneath the inner ends of the fingers 148 in a manner similar to that described in the embodiment of FIGS. 1–7 so that upward movement of the bar 28 with respect to the housing 116 will cause the fingers 148 to be pivoted into the interior of housing 116. Inasmuch as the locking mechanism 154 is identical to the locking mechanism 154', only locking mechanism 154 will be described with identical structure on locking mechanism 154' being indicated by '. The springs 136 and 136' normally urge links 132 and 132' upwardly away from the brackets 134 and 134' respectively which causes the bar 128 to be moved upwardly with respect to the housing 116 so that the locking fingers 148 and 148' are pivoted into the interior of the housing 116 as illustrated in FIG. 10.

In operation, the handles 112 and 114 are normally positioned in housing 116 with only the upper ends thereof being exposed on platform 102. When it is desired to use the dock plate 100 to span the area between the dock 12 and the carrier 14, the forks of the fork lift truck are extended through the handles 112 and 114. The fork lift truck may then transport the dock plate 100 to the desired location and position the same between the dock 12 and carrier 14. When the dock plate 100 is lowered with respect to the dock 12 so that the housing 116 is positioned between the carrier 14 and dock 12, the free ends of the pivot arms 138 and 138' engage the upper surface of the dock 12 as illustrated in FIG. 8. The dock plate 100 would be positioned so that the rearward end of bottom 118 of housing 116 engage the surface 88 of the carrier 14. The lowering of the dock plate 100 in the area between the dock and the carrier causes the pivot arms 138 and 138' to pivot with respect to ears 142 and 142' so that links 132 and 132' are lowered to compress the springs 136 and 136'. The lowering of the links 132 and 132' by the pivot arms 138 and 138' causes bar 128 to be lowered within housing 116 which permits the fingers 148 and 148' to pivot outwardly from the housing 116. The fingers 148 and 148' engage the surface 90 of the dock 12 and limit the movement of the dock plate 100 in a manner identical to the embodiment of FIGS. 1–7. When the dock plate is to be removed from between the dock 12 and carrier 14, it is simply necessary to again reinsert the forks of the fork lift truck into handles 112 and 114 and to raise the same with respect thereto. The upward vertical movement of the dock plate 100 with respect to the dock 12 causes the free ends of the pivot arms 138 and 138' to disengage from the upper surface of dock 12 to permit the springs 136 and 136' to again urge links 132 and 132' in an upward direction to cause bar 128 to pivot the locking fingers 148 and 148' into the interior of housing 116.

The dock plate of FIGS. 12–15 is generally referred to by the reference numeral 160 and is also adapted to span the space between a loading dock 12 and the bed of the carrier 14. Dock plate 160 includes a platform 162 having tapered ends 164 and 166 and sides 168 and 170. Platform 162 is provided with a pair of rectangular openings 172 and 174 formed therein having handles 176 and 178 vertically movable received thereby respectively. The handles 176 and 178 are adapted to receive the forks of a fork lift truck or the like extending therethrough. A hollow housing 180 is provided on the underside of platform 162 beneath handles 176 while a hollow housing 180' is provided on the underside of platform 162 beneath handle 178 as best illustrated in FIG. 13. The numerals 182 and 182' designate locking mechanisms which are mounted in housings 180 and 180' and which are identical in construction. Inasmuch as locking mechanisms 182 and 182' are identical, only locking mechanism 182 will be described in detail with identical structure on locking mechanism 182' being indicated by "'." A shaft 184 is mounted in and extends between walls 186 and 188 of housing 180 and has a plurality of locking fingers 190 pivotally mounted thereon. Each of the locking fingers 190 has a spring 192 associated therewith which functions identically to the locking fingers 72 and springs 82 in the embodiment of FIGS. 1–7. Handle 176 is provided with a bar portion 194 which extends under the inner ends of the locking fingers 190 so that the upward vertical movement of the handle 176 with respect to the platform 162 will cause the locking fingers 190 to be pivoted into the interior of housing 180 as illustrated in FIG. 14.

In operation, the handles 176 and 178 are normally positioned in housings 180 and 180' respectively with only the upper ends thereof being exposed. When handles 176 and 178 are in their lowered position, the bar portions 194 and 194' will also be lowered so that the locking fingers 190 and 190' will pivot outwardly from the housings 180 and 180'. When it is desired to use the dock plate 160 to span the area between the dock 12 and the carrier 14, the forks of the fork lift truck are extended through the handles 176 and 178 respectively. The fork lift truck may then transport the dock plate 160 to the desired location and position the same between the dock 12 and carrier 14. The upward movement of handles 176 and 178 by the forks causes the bar portions 194 and 194' to be raised to the position of FIG. 13 so that the locking fingers are pivoted inwardly into the interior of their respective housings such as illustrated in FIG. 14. The fork lift truck positions the dock plate 160 so that the walls 196 and 196' of the housings 180 and 180' respectively abuts against the surface 88 of carrier 14 and so that the undersides of ends 164 and 166 rest upon the upper surfaces of dock 12 and the bed of the carrier 14. The forks of the fork lift truck are then removed from the handles 176 and 178 which permits the handles to drop downwardly into their respective housings. The springs 192 and 192' cause the fingers 190 and 190' to pivot outwardly from the interior of their respective housings so that the fingers engage the surface 90 of dock 12 as in the previous embodiments to limit the movement of the dock plate and to automatically lock the same in position. The dock plate 160 may be easily removed from its operative position by simply causing the forks of the fork lift truck to again be reinserted through the handles 176 and 178 and lifting the dock plate from between the dock 12 and the carrier 14.

In each of the embodiments discussed hereinbefore, a means has been provided for automatically locking the dock plate into position between a dock and a carrier so that the dock plate will not move as equipment is passed thereover. The locking means disclosed in each of the embodiments compensates for any variances in the distance between the carrier and the dock which permits the dock plates to be used in a wide range of situations. The locking fingers in each of the embodiments are positively maintained in abutting engagement with the outer surface of the dock due to the spring means connected thereto so that the dock plates will not move when equipment is passed thereover.

Thus it can be seen that the embodiments accomplish at least all of their stated objectives.

I claim:

1. In a device of the class described, comprising,
a dock plate having approach ends adapted to bridge spaced supporting structures, said dock plate having a platform between said approach ends, said dock plate having upper and lower surfaces and opposite sides,
a handle means on said platform adapted to support said dock plate at times to facilitate the positioning of said dock plate between said supporting structures,
an automatic locking means on the underside of said platform adapted to engage one of the supporting structures to limit the movement of said dock plate towards said one supporting structure,
and a fixed stop means on the underside of said platform adapted to engage the other supporting structure to limit the movement of said dock plate toward said other supporting structure,
said automatic locking means including at least one locking finger which is pivotally mounted intermediate its lengths about a horizontal axis which is parallel to said approach ends,
said finger being pivotally movable about said horizontal axis from locked to unlocked positions,
first means normally urging said finger into said locked position,
an override means adapted to move said finger into said unlocked position,
said finger having one end extending outwardly of said horizontal axis when in said locked position whereby said finger will have its said one end abutting against said one supporting structure to limit the movement of said dock plate towards said one supporting structure.

2. The device of claim 1 wherein first and second spaced apart locking means are positioned on the underside of said platform adjacent the opposite sides thereof respectively.

3. The device of claim 2 wherein said handle means is vertically movable and is operatively connected to said override means to actuate the same when said handle means is raised with respect to said platform.

4. The device of claim 3 wherein said override means includes a bar means positioned beneath said platform and being vertically movable with respect thereto, said handle means being operatively connected to said bar means, said bar means being positioned below the other ends of said fingers so that upward movement of said bar means will cause said fingers to pivot to said unlocked position.

5. The device of claim 2 wherein each of said locking fingers includes first and second end portions which are angularly disposed with respect to each other, said first means being a spring means connected to said second end of said finger and extending downwardly therefrom, said first end of said finger being the said one end which abuts against said one supporting structure.

6. The device of claim 5 wherein said handle means includes first and second spaced apart handle members, said first and second handle members having a bar portion extending under the said second end portions of said fingers of said first and second locking means respectively.

7. The device of claim 5 wherein said override means includes a bar means positioned beneath said platform and extending outwardly of said opposite sides, said bar means extending beneath the said second end portions of said fingers, said override means including a spring means operatively connected to the opposite ends of said bar means which normally urges said bar means upwardly against said fingers to yieldably maintain said fingers in said unlocked position, said bar means having a pivot arm means operatively secured thereto which is adapted to engage said one supporting structure as said dock plate is positioned between said structures, the engagement of said pivot arm means with said one supporting structure causing said bar means to be lowered with respect to said fingers as said dock plate is lowered onto said supporting structures, the lowering of said bar means permitting said fingers to pivot from said unlocked position.

References Cited
UNITED STATES PATENTS

| | | | |
|---|---|---|---|
| 3,192,546 | 7/1965 | Noland | 14—72 |
| 3,238,548 | 3/1966 | Christensen | 14—72 |
| 3,299,457 | 1/1967 | Harris | 14—72 |

JACOB L. NACKENOFF, Primary Examiner